United States Patent
Kanehara et al.

(10) Patent No.: US 6,440,023 B2
(45) Date of Patent: Aug. 27, 2002

(54) METAL V-BELT

(75) Inventors: Shigeru Kanehara; Takamichi Shimada, both of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/382,204

(22) Filed: Aug. 23, 1999

(30) Foreign Application Priority Data

Aug. 31, 1998 (JP) .......................... 10-244936

(51) Int. Cl.⁷ .............................. F16G 1/22; F16G 5/16
(52) U.S. Cl. ........................ 474/242; 474/240; 474/248
(58) Field of Search ............................... 474/240, 242, 474/244, 245, 246, 247, 201, 272, 237, 248

(56) References Cited

U.S. PATENT DOCUMENTS

| | | | |
|---|---|---|---|
| 4,824,424 A | * 4/1989 | Ide et al. | 474/242 |
| 4,826,473 A | * 5/1989 | Miyawaki | 474/240 |
| 5,169,369 A | * 12/1992 | Masuda et al. | 474/242 |

FOREIGN PATENT DOCUMENTS

| | | | |
|---|---|---|---|
| JP | 98733 | * | 4/1989 |
| JP | 311378 | * | 11/1989 |
| JP | 5-106691 | | 4/1993 |
| JP | 6-272737 | | 9/1994 |
| JP | 8-30517 | | 3/1996 |
| JP | 10-47438 | | 2/1998 |

\* cited by examiner

*Primary Examiner*—David A. Bucci
*Assistant Examiner*—Marcus Charles
(74) *Attorney, Agent, or Firm*—Arent Fox Kintner Plotkin & Kahn, PLLC

(57) ABSTRACT

Clearance Cs during a no-load stop and allowable value Cto of total clearance Ct obtained as a sum of clearance Ch occurring due to Hertzian stress are stipulated to a value less than height h of male coupling 28 along with an allowable value σhmo of the maximum Hertzian stress acting on rocking edge 26 being stipulated to a value less than an upper limit value σho of the Hertzian stress that satisfies the opposing pitching lifespan. The radius of curvature R of the rocking edge is set within a range that satisfies R1≦R≦R2 for the radius of curvature R1 determined in correspondence with the allowable value σhmo of the maximum Hertzian stress and the radius of curvature R2 determined in correspondence with the allowable value Cto of the clearance between the total elements.

7 Claims, 7 Drawing Sheets

Fig. 4

| Change gear ratio \ Rocking edge R (mm) | 4 | 6 | 8 | 10 | 12 | 14 |
|---|---|---|---|---|---|---|
| 0.5 | 0.293 | 0.395 | 0.497 | 0.600 | 0.702 | 0.805 |
| 0.61 | 0.258 | 0.351 | 0.444 | 0.537 | 0.630 | 0.724 |
| 0.8 | 0.231 | 0.317 | 0.403 | 0.489 | 0.574 | 0.661 |
| 1.0 | 0.225 | 0.308 | 0.392 | 0.477 | 0.561 | 0.645 |
| 1.25 | 0.231 | 0.317 | 0.403 | 0.489 | 0.574 | 0.661 |
| 1.64 | 0.258 | 0.351 | 0.444 | 0.537 | 0.630 | 0.724 |
| 2.0 | 0.293 | 0.395 | 0.497 | 0.600 | 0.702 | 0.805 |
| 2.5 | 0.353 | 0.469 | 0.586 | 0.703 | 0.821 | 0.939 |

In traveling direction V-belt ←

METAL V-BELT

RELATED APPLICATIONS

This application claims the priority of Japanese Patent Application No. 10-244936 filed on Aug. 31, 1998, which is incorporated herein by reference.

FIELD OF THE INVENTION

The present invention is related to a metal V-belt used as a power transmission means in a V-belt infinite variable-speed drive and in particular to a metal V-belt that comprises metal elements.

BACKGROUND OF THE INVENTION

This type of metal V-belt is already known conventionally and is comprised by an endless belt shaped metal ring and a plurality of elements supported along the metal ring. Further, this metal V-belt transmits power between a drive pulley and a driven pulley. Both of these pulleys can variably control the V channel width and by means of variably controlling this V channel width, the wrapping radius of the V-belt on both pulleys can be changed and the change gear ratio changed in infinite steps.

FIG. 8 and FIG. 9 show examples of the composition of the elements used in this type of metal V-belt. The element 30 has a front surface 31 and a rear surface 32 parallel to each other and a tapered surface 33 is formed on the lower half of the front surface 31. This tapered surface gradually changes its thickness along the rear surface 32. Further, on the left and right sides of the element 30 a ring channel 34 is formed whereon is attached a metal ring (not shown in the figure).

A V side face 35 is formed on both the left and right sides of the tapered surface 33. This V side face is supported on a slanted surface of a pulley (not shown in the figure). The boundary between the front surface 31 and the tapered surface 33 is a rocking edge 36. Each element 30 allows this rocking edge 36 to make contact with the rear surface 32 of the preceding adjacent element 30 on the pulley allowing this to lean frontward and rearward as an axis. Because of this, the V-belt can wind on the pulley. Further, a cylindrical-shaped protruding male coupling 37 is formed on the front surface 31 and a round-shaped hole female coupling 38 is formed on the rear surface 32. Both of these couplings 37, 38 are engaged and connect to each other between adjacent elements 30, 30 which in turn lines up forming one row on the metal ring.

In a metal V-belt with this type of composition, when relative slippage occurs between the elements and pulleys during the transmission of power due to clearance (space) between the elements or when the core of the metal belt shifts between the driving and driven pulleys, there is the danger of the lifespan of the V-belt being reduced because of friction between the members. There have been numerous proposals up to now for metal V-belts which implemented different element shapes in order to reduce relative slippage during the transmission of power and core shifting. Japanese Laid-open Patent Publication No.06-272737 (A) is an example of this. This example is one in which the pulley winding radius characteristics are improved and the core shifting is reduced by means of forming the lower end portion from the rocking edge of the element in a shape that becomes thinner a the end on the tapered surface and the convex circular arc-shaped surface.

Besides this, for example, Japanese Patent Publication No. 08-30517 (B) discloses a composition wherein the rocking edge is a shape that combines a circular arc-shaped surface with a large diameter and a circular arc-shaped surface with a small diameter and the adjacent element pitch on the pulleys is made smaller to reduce the relative slippage between the elements and the pulleys. Another example is Japanese Laid-open Patent Publication No.05-106691 (A) in which is disclosed a composition wherein two or more rocking edges are provided on the element to allow the essential length of the perimeter of the V-belt to change in response to the winding radius of the pulley which in turn controls the amount the core shifts to minimum levels during speed changes. An even further example is Japanese Laid-open Patent Publication No.10-47438 (A) in which is disclosed a composition wherein rocking edges are provided on both the front surface and the rear surface of the element to allow the changes in the clearance between elements due to the velocity ratio thereby controlling slippage between the V-belt and the pulleys.

However, when determining the shape of the elements of the above-mentioned metal V-belts, in particular, the radius of curvature of the convex circular arc-shaped rocking edge, the Hertzian stress acting on the rocking edge during the transmission of power was taken into account. This Hertzian stress is a parameter that affects the clearance between the elements and the opposing pitching lifespan. If this is not taken into account, there will be excessive clearance and the slippage between the pulleys and elements will grow larger and in addition there is a possibility that pitching caused by rough contact at the rocking edge may reduce the lifespan of the elements.

SUMMARY OF THE INVENTION

The object of the present invention is to provide a metal V-belt with a composition that can maintain a suitable clearance between elements.

A further object of the present invention is to provide a metal V-belt with a composition that sufficiently satisfies a performance resistant to pitching.

The metal V-belt of the present invention comprises an endless belt shaped metal ring member and a plurality of metal element members supported along the metal ring member. This V-belt transmits power between a drive pulley and a driven pulley. The metal element members have a cross-sectional convex circular arc-shaped rocking edge with an axis leaning against the opposing front and rear metal element members along with having a convex portion (for example, the male coupling 28 in the embodiment) and a concave portion (for example, the female coupling 29 in the embodiment) on the principal plane. By means of engaging the adjacent metal element members together, the convex portion and the concave portion can be lined up in a row at the front and rear on the metal element members. An allowable value of a clearance (Ct) between the total elements obtained as a sum of clearance (Cs) between the elements during a no-load stop when this metal V-belt is stretched between the drive pulley and the driven pulley and clearance (Ch) between the elements occurring due to Hertzian stress acting on the rocking edge of the metal element members while the metal V-belt is transferring power is stipulated to a value less than the protruding height (for example, height h of male coupling 28 in the embodiment) of the convex portion.

Furthermore, in the present invention, the maximum Hertzian stress ($\sigma hm$) acting on the rocking edge while the metal V-belt is transferring power is stipulated to a value less than the allowable Hertzian stress ($\sigma ho$) that satisfies the opposing pitching lifespan of the metal element members. Namely, the radius of curvature R of the rocking edge is set within a range that satisfies $R1 \leq R \leq R2$ for a minimum radius of curvature R1 determined in correspondence with the maximum Hertzian stress and a maximum radius of curvature R2 determined in correspondence with an allowable value of clearance between the total elements.

If a metal V-belt with this type of composition is provided, the clearance between the elements is always maintained at a fixed gap (less than the protruding height of the convex portion). Therefore, friction between the pulleys and element can be reduced along with improving the transmission efficiency of the power. Further, the opposing pitching lifespan is always satisfied thereby improving endurance reliability. Even further, even if external disturbances, such as vibration, occur while the metal V-belt is transferring power, the linkage between the elements will not separate thereby eliminating an possibility of damage to the male-female engagement portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein:

FIG. 4 is a table showing clearance reduction values from a natural toroidal state of the metal V-belt of an embodiment;

DESCRIPTION OF THE PREFERRED EMBODIMENTS

Figure 1:
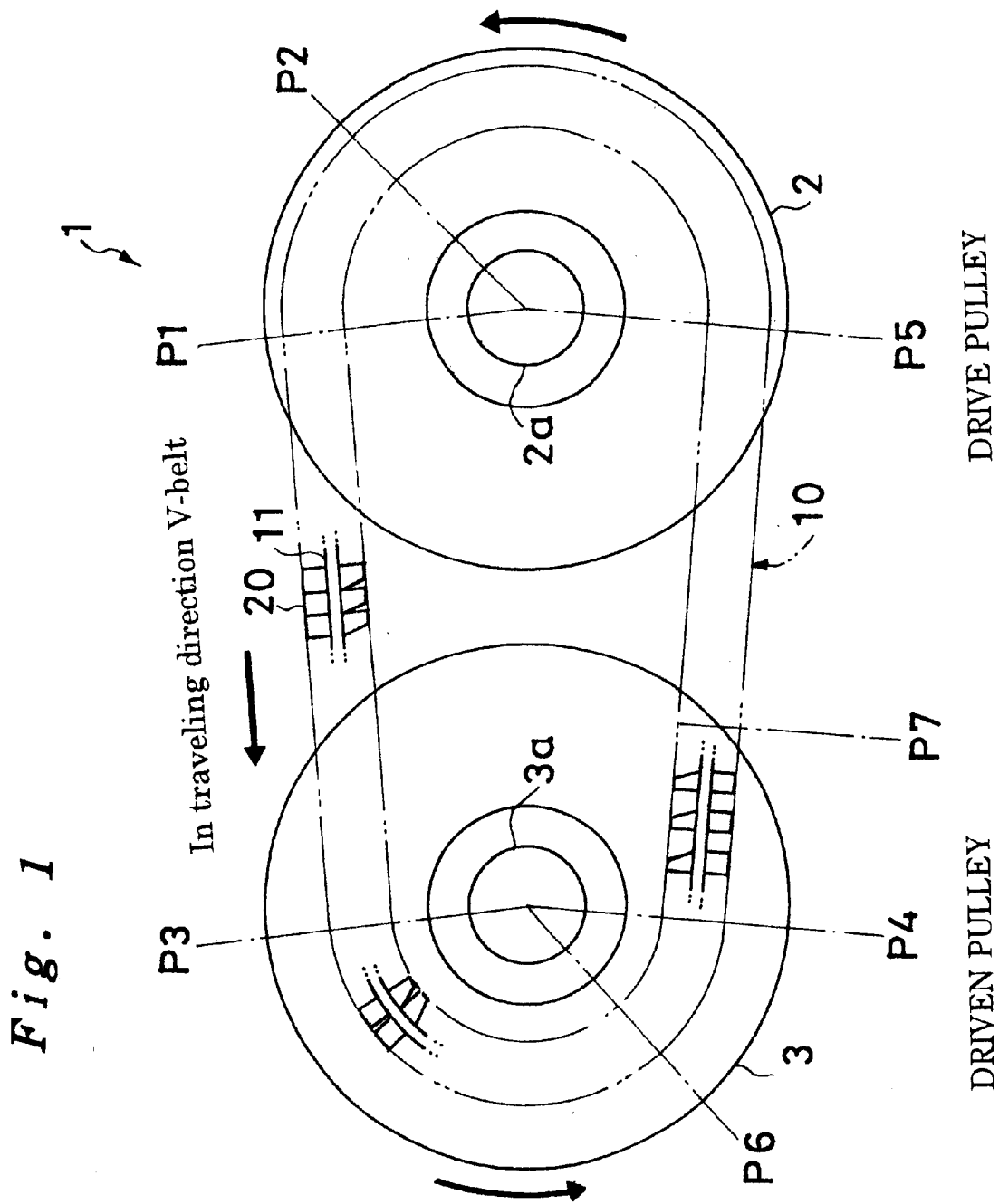
FIG. 1 is an outline view showing a power transmission apparatus provided with the metal V-belt of the present invention.

FIG. 1 shows a power transmission apparatus provided with the metal V-belt of the present invention. This power transmission apparatus 1 is comprised by a drive belt 2 mounted to a drive shaft 2a, a driven pulley 3 mounted to a driven shift 3a, and a metal V-belt 10 (hereinafter referred to as V-belt) stretched between both pulleys 2, 3. Both of the pulleys 2,3 can variably control the pulley channel width and by means of variably controlling this pulley channel width, the wrapping radius for both pulleys 2, 3 of the V-belt 10 can be changed and the change gear ratio from the drive shaft 2a to the driven shaft 3a changed in infinite steps.

Figure 2:
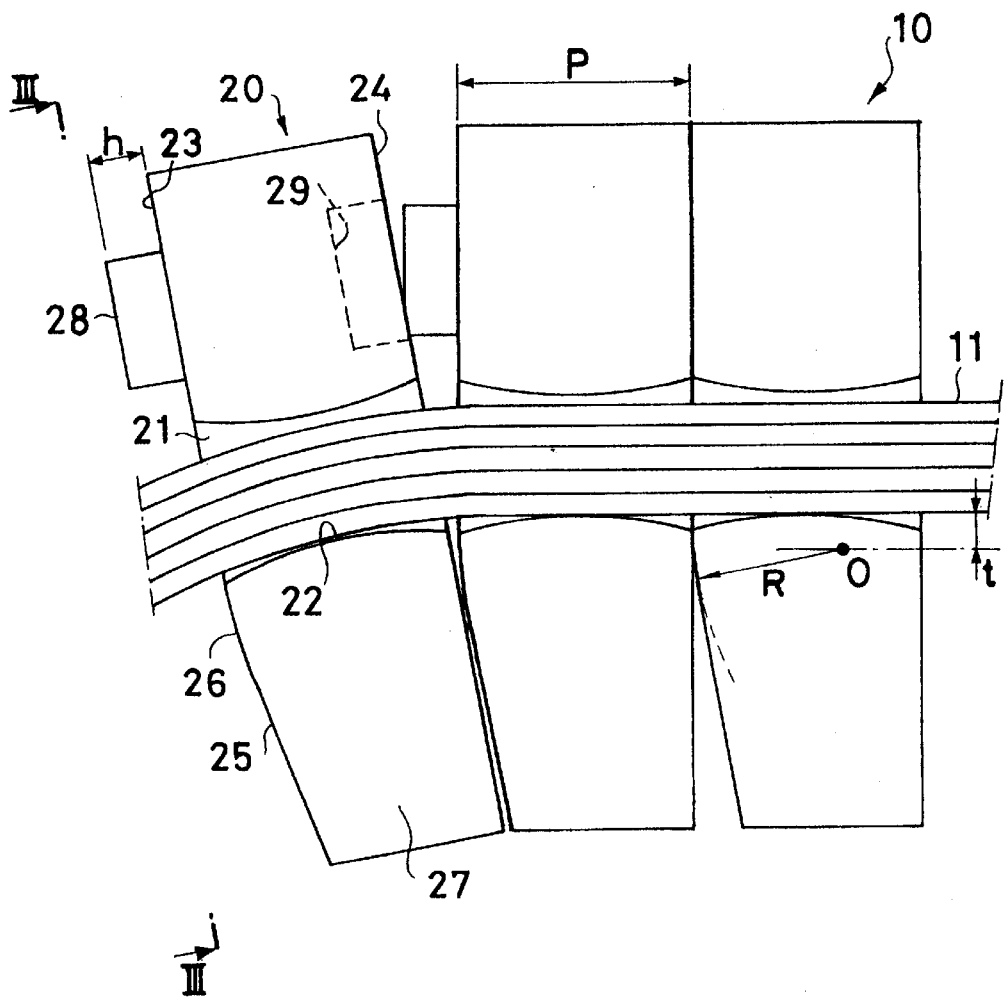
FIG. 2 is a side view showing an expanded view of the metal V-belt of FIG. 1.
Figure 3:
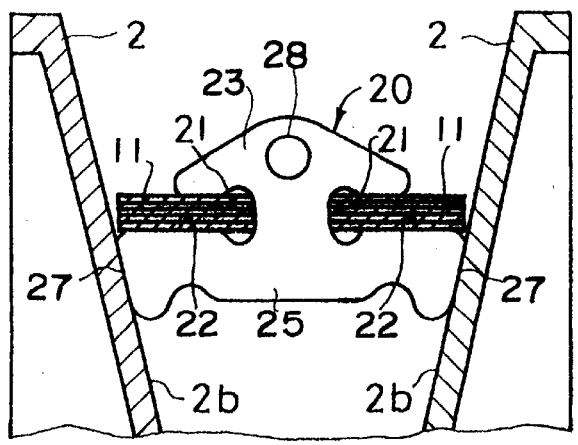
FIG. 3 is a front view seen from arrows III—III of FIG. 2.

FIG. 2 shows an expanded view of the V-belt 10 and FIG. 3 is a view seen from arrows III—III of FIG. 2. As can be understood from these figures, the V-belt 10 is comprised by successively mounting a plurality of elements 20, 20 along an endless belt shaped metal ring 11. Further, the metal ring 11 is formed by layering a few rings (for example, 12 rings) of thin metal rings.

As shown in FIG. 3, ring channels 21 are formed on the left and right sides of each element 20 and a pair of left and right metal rings 11 are fitted into these channels 21. Because of this, the innermost peripheral surface of the metal rings 11 rub against the lower side of a saddle surface 22. Further, as shown in FIG. 2, each element 20 has a front surface 23 and rear surface 24 parallel to each other (the front surface 23 and rear surface 24 form a principal plane) and the lower half of the front surface 23 forms a tapered surface 25 such that the thickness reduces towards the rear surface 24 side. A radius of curvature R exists in the boundary between the front surface 23 and the tapered surface 25 and a cross-sectional convex circular arc-shaped rocking edge 26 is formed extending laterally against both the front surface 23 and the tapered surface 25. The center of the radius of curvature R of the rocking edge 26 is positioned downward away from the saddle surface 22 by only t.

Each element 20 is allowed to make contact with the rear surface 24 of the preceding element 20 opposite the rocking edge 26 allowing the element to lean forward and rearward. This makes it possible for the V-belt 10 to wind on both pulleys 2, 3. Further, a V side face 27 is formed on both the left and right sides of the tapered surface 25. This V side face is supported on a slanted surface 2b (or 3b) of the pulley 2 (or 3). By means of changing the channel width of the pulley 2 (or 3), the elements 20 can be moved up and downs which in turn allows the winding radius of the V-belt 10 to be changed.

A cylindrical-shaped protruding male coupling 28 is formed on the upper half portion of the front surface 23 of each element 20 and a round-shaped hole female coupling 29 is formed on the upper half portion of the rear surface 24. Each element 20 arranged and mounted on the V-belt 10 engages its respective male coupling 28 into the female coupling 29 of the preceding element 20 thereby controlling the lateral movement arranged on the V-belt 10.

Next, the transmission of power from the drive pulley 2 in the power transmission apparatus 1 to the driven pulley 3 will be described based on FIG. 1. When the drive pulley 2 rotates, that rotation force becomes a pressing force between the elements 20, 20 on the V-belt 10 and is transmitted. This is what drives the driven pulley 3. The means to transmit this pressing force are elements 20, 20 of the region P2~P1~P3~P4 from among all the elements 20, 20 on the V-belt 10 which reach from a front position P2 located away from an outlet (P1 of FIG. 1) of the drive pulley 2 to an outlet P4 of the driven pulley 3 passing through an inlet P3 of the driven pulley 3. Therefore, regions other than these, namely, elements 20, 20 of the region P4~P5~P2 reaching from the outlet P4 of the driven pulley 3 to the position P2 passing through the inlet P5 of the drive pulley 2 are in an advancing state and do not transmit the pressing force.

From among the element region P2~P1~P3~P4 that transmits the pressing force, region P6~P4 from the position P6 in front of outlet P4 of the driven pulley 3 to the outlet P4 of the driven pulley 3 are regions which gradually release the pressing force between the elements 20, 20. And even further, the element 20 forcibly protrudes from the outlet P4 in order for the pressing force to be quickly released from the restriction caused by the pulley slanted surface 3b on the outlet P4 of the driven pulley 3. Because of this, there is a good possibility that the elements 20, 20 in the region P4~P7 from the outlet P4 to the location P7 at that point will be separated from each other and therefore, there is a good possibility that the clearance obtained between adjacent elements 20, 20 will be at the maximum in the region P4~P7. Moreover, the region P6~P4 are approximately 30% of the region P3~P4.

The region P2~P1 from among the above-mentioned element region P2~P1~P3~P4 which transmit the pressing force is a region wherein the elements 20, 20 which have advanced are gradually prepared to transmit the pressing force without transmitting the pressing force in the region P4~P5~P2. Because of this, when the clearance between elements which have the V-belt 10 is large, the relative slippage between the element 20 in the region P2~P1 and the drive pulley 2 grows larger with the generation of heat between the elements 20, 20 and the drive pulley 2 causing the transmission efficiency of the power to worsen. Therefore, it is preferable for the clearance between elements which have the V-belt 10 to be as small as possible. Also, region P2~P1 is normally approximately 20%~40% of the region P5~P1.

In the V-belt 10 with this type composition, a characteristic in the present invention is the way to set the radius of curvature in the rocking edge 26 of the element 20. This is described in the following.

The above mentioned V-belt 10 has clearance between the elements in a natural toroidal state. However, besides the common elements 20 which have identical thickness' P, this clearance between the elements can be freely set to any value by means of using an adjustment element 20 that has a thickness slightly smaller than these common elements 20. Generally, the clearance between the elements is know to be at its maximum in a natural toroidal state and is reduced from this value when the V-belt 10 is wound around the pulleys 2, 3. This reduced clearance amount differs depending on the pitch radius ratio of the wound pulleys 2, 3, in other words, the change gear ratio r (=pitch radius of driven pulley 3/pitch radius of drive pulley 2) and when the change gear ratio r is 1.0, it is at its minimum and grows larger as the change gear ratio r moves away from 1.0. Namely, if change gear ratio r1, r2 are 1.0<r1<r2, the reduced clearance amount for r2 will become larger and if change gear ratios r3, r4 are 1.0>r3>r4, the reduced clearance amount for r4 will become larger. Furthermore, if change gear ratios rl, r3 are 1/r1=r3, both of the reduced clearance amounts will become equal.

Hereupon, if the clearance between the elements in a natural toroidal state (hereinafter referred to as initial clearance) is Co and the reduced clearance amount when the pulleys 2,3 are wound is ΔC, the clearance between the elements in this wound state an be represented by Cs as shown below. The clearance between the elements Cs in this pulley wound state is fixed by a geometric shape and this is referred to as clearance Cs during a no-load stop hereinafter as clearance between the elements during a no-load stop.

$$Cs=Co-\Delta C \quad (1)$$

The clearance between the elements of the V-belt 10 as described above is preferably small. As understood from equation (1), the reason the initial clearance Co can be brought close to the clearance reduction value ΔC is to make the clearance Cs during a no-load stop as small as possible although the initial clearance Co can be made to match the clearance reduction value ΔC in a change gear ratio ro wherein the clearance reduction value grows to its maximum value in order that pulley tension is not applied to the V-belt 10 at any change gear ratio r. By means of setting the initial clearance Co in this manner, the clearance Cs during a no-load stop can be reduced to a minimum in all change gear ratios r. Further, it is only natural that the clearance Cs during a no-load stop becomes zero (0) at change gear ratio ro wherein the clearance reduction value grows to its maximum value.

In contrast, during the transmission of power, (while V-belt 10 moves), Hertzian stress (contact stress) σh acts on each rocking element 26 in the element region P2~P1~P3~P4 that transmits the pressing force of the above-mentioned elements 20, 20. Because of this, the elements 20, 20 region P2~P1~P3~P4 deform due to compressive elasticity and the distance between the centers of the adjacent elements 20, 20 compresses. Then the clearance between the elements increases from the clearance Cs during a no-load stop. The clearance between the elements of this increased portion is obtained by means of finding the total sum of the approach value of the distance between the centers of each of the adjacent elements 20, 20 using each Hertzian stress ah value acting on the elements 20, 20 located in the region P2~P1~P3~P4. This increase in the clearance between the elements is caused by Hertzian stress ah and hereinafter is referred to as clearance Ch due to Hertzian stress.

If the change gear ratios r of the wound pulleys 2,3 is different, the clearance Ch due to Hertzian stress will change the load conditions (such as input rpms and input torque) expected to be examined at each change gear ratio and because the pressing force between the blocks will also become different following this, the magnitude of the clearance Ch due to Hertzian stress will be dependent on the change gear ratio r in like manner to the clearance Cs during a no-load stop. Further, if the sum of the clearance Cs during a no-load stop and the clearance Ch due to Hertzian stress is total clearance Ct (=Cs+Ch), this total clearance Ct will also be dependent on the change gear ratio r.

As shown in a subsequent embodiment, when the change gear ratios r are identical and the radius of curvature R of the rocking edge 26 is allowed to be changed, the clearance Cs during a no-load stop and the clearance Ch due to Hertzian stress will tend to increase following increases in the radius of curvature R. Because of this, the total clearance Ct will also increase following increases in the radius of curvature R.

As described above, while the V-belt is transmitting power, the adjacent elements 20, 20 separate from each other mainly in regions P4~P7 and at this time, the maximum obtainable clearance between the elements that can occur between adjacent elements 20, 20 is total clearance Ct. In order to maintain the alignment of each element 20 on the metal ring 11, as described above, the adjacent elements 20, 20 must link with the male and female couplings 28, 29 and at a minimum both male and female couplings 28, 29 must be maintained in a state in which they do not come apart. Hereupon, if the clearance between the adjacent elements 20, 20 increases and the male and female couplings 28, 29 come apart, not only will the alignment of the elements 20 on the metal ring 11 be put in disorder but there will be the danger that the male coupling 28 will ride up onto the rear surface 24 of the preceding element 20 damaging the female coupling 29. In order to prevent this, it is preferable for the maximum obtainable clearance between the elements that can occur between adjacent elements 20, 20, namely, the total clearance Ct to always be made a value less than the coupling height h (see FIG. 2). Therefore, an allowable value Cto of the total clearance Ct is set to a value less than the coupling height h and an upper limit value of the rocking edge radius of curvature R is set to a value R2 that corresponds to the allowable value Cto.

Further, this is also shown in a subsequent embodiment. When the change gear ratios r are identical and the radius of curvature R of the rocking edge 26 is allowed to be changed, the maximum Hertzian stress σhm (maximum value of Hertzian stress σh) acting on the rocking edge 26 of each element 20 grows larger following reductions in the rocking edge radius of curvature R. The Hertzian stress σh acting on the rocking edge 26 allows pitching to occur on that rocking edge 26 and when the Hertzian stress σh acting on the rocking edge is higher than a fixed value, there is the danger that the V-belt 10 may experience reductions in its lifespan due to the pitching. Because of this, the maximum Hertzian stress σhm acting on the rocking edge 26 must be less than an upper limit value σho of the Hertzian stress that satisfies the opposing pitching lifespan in order that reductions in the lifespan of the V-belt 10 caused by at least pitching does not occur. Therefore, the allowable value σhmo of the maximum Hertzian stress σhm is set to a value smaller than the upper limit value σho of the Hertzian stress that satisfies the above-mentioned opposing pitching lifespan and the lower limit value of the rocking edge radius of curvature R is set to a value R1 that corresponds to the allowable value σhmo.

In this manner, if the rocking edge radius of curvature R is within the range R1≦R<R2 using lower limit value R1 and upper limit value R2, the clearance between the elements will always be maintained at a fixed gap (less than height h of the female coupling 29). Therefore, friction between the metal ring 11 and the element 20 can be reduced along with relative slippage between the metal ring 11 and the element 20 made smaller thereby improving the transmission efficiency of the power. Further, the opposing pitching lifespan is always satisfied thereby improving endurance reliability. Even further, even if external disturbances, such as vibration, occur while the V-belt 10 is transferring power, the linkage between the adjacent elements 20, 20 will not separate thereby eliminating an possibility of damage to the male-female couplings 29, 30.

Next, as shown in the embodiments implemented by the inventors, the procedure to set the range of the rocking edge radius of curvature R will be described in detail. In this embodiment, the specifications of the metal V-belt 10 were as follows.

Element thickness P:1.5 mm (element thickness to adjust clearance is slightly smaller than this )

Start position t of the rocking edge radius of curvature R:1.0 mm

Maximum inner peripheral length of the metal ring 11:656 mm

Distance between axis of pulleys 2, 3:155 mm

To start, changes to the rocking edge radius of curvature R of the clearance reduction value ΔC when the metal V-belt 10 of the above-mentioned specifications is stretched across the pulleys 2, 3 were found for each change gear ratio r. There were six types of rocking edge radius of curvature R, 4 mm, 6 mm, 8 mm, 10 mm, 12 mm and 14 mm and eight types of change gear ratios r 0.5, 61, 0.8, 1.0, 1.25, 1.64, 2. And 2.5. The table in FIG. 4 shows these results.

As understood from the table in FIG. 4, the clearance reduction value ΔC is at its maximum at change gear ratio r=2.5 for any rocking edge radius of curvature R. Therefore, in this embodiment, the value of the initial clearance for each rocking edge radius of curvature R is set such that is becomes equal to the clearance reduction value ΔC at change gear ratio ro=2.5 (because of this, the clearance Cs during a no-load stop at change gear ratio ro=2.5 is zero (0) for every radius of curvature R).

After carrying out these settings, the clearance between the elements and the maximum Hertzian stress σhm for the following types of endurance motors were found.

① LOW: change gear ratio=2.5, input torque=14.5 kgf-m, input rpm=5500 rpm

② TOP: change gear ratio=0.61, input torque=14.3 kgf-m, input rpm=6000 rpm

Figure 5:
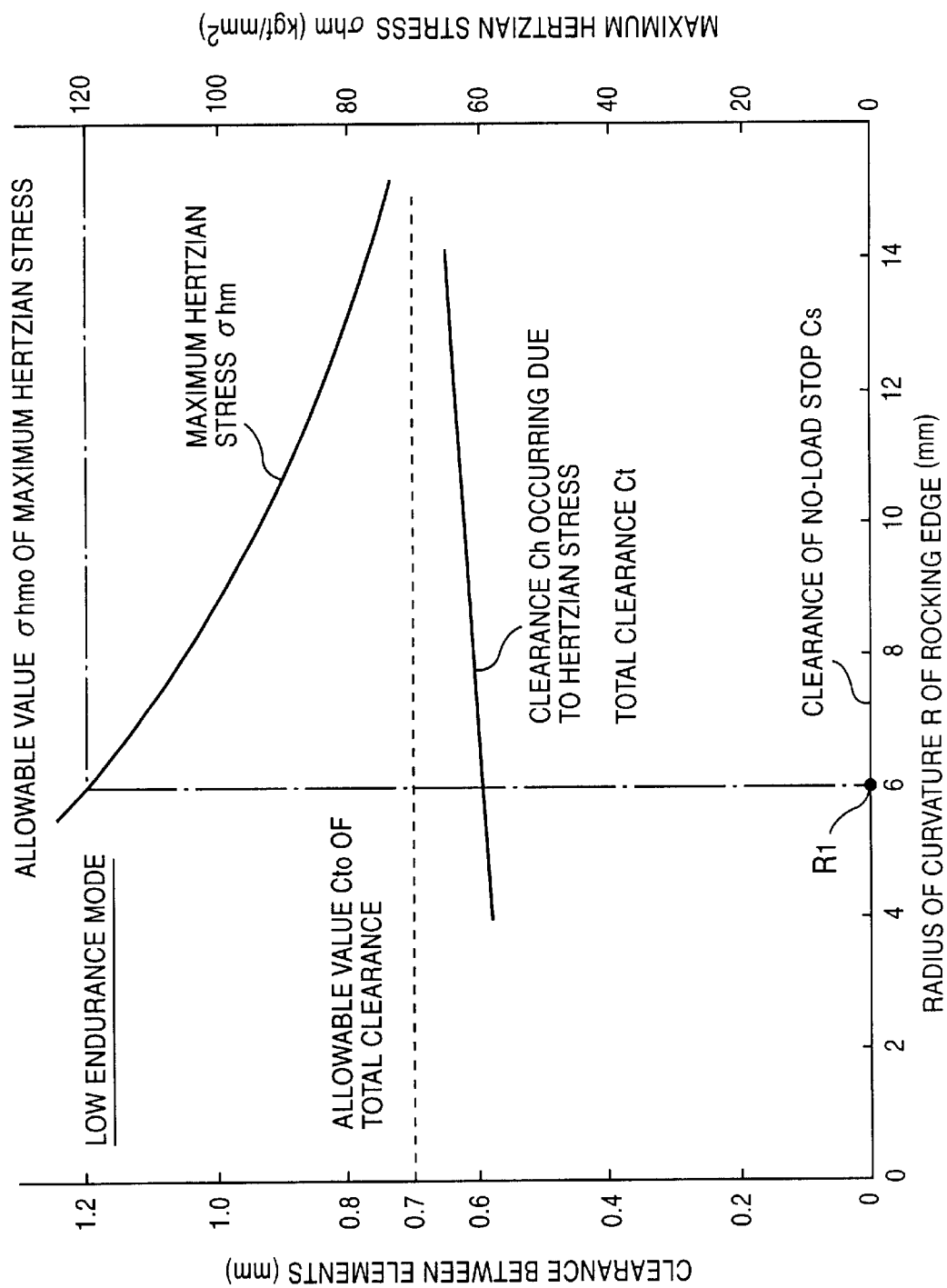
FIG. 5 is a graph showing results in a LOW endurance motor of an embodiment.
Figure 6:
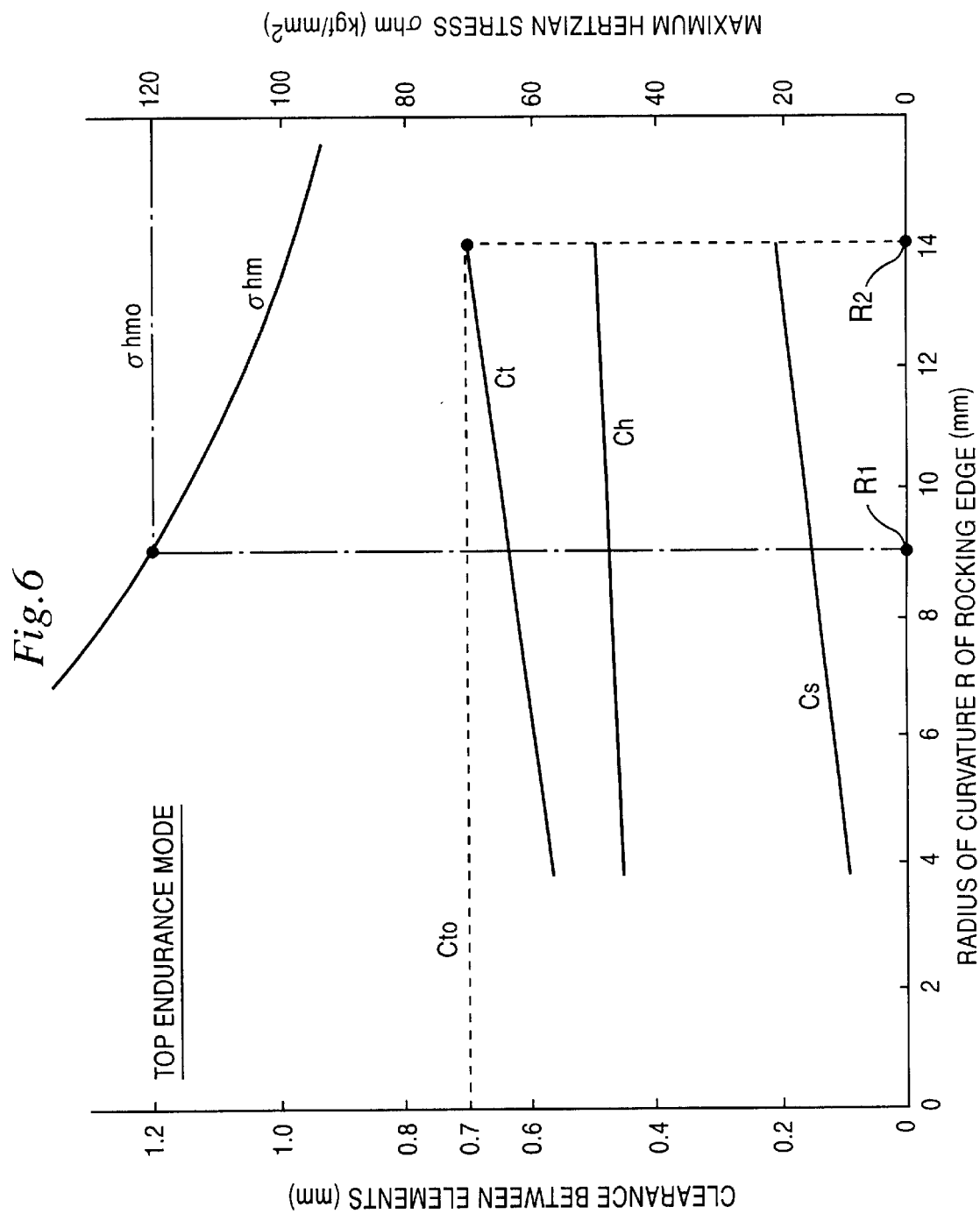
FIG. 6 is a graph showing results in a TOP endurance motor of an embodiment.
Figure 7:
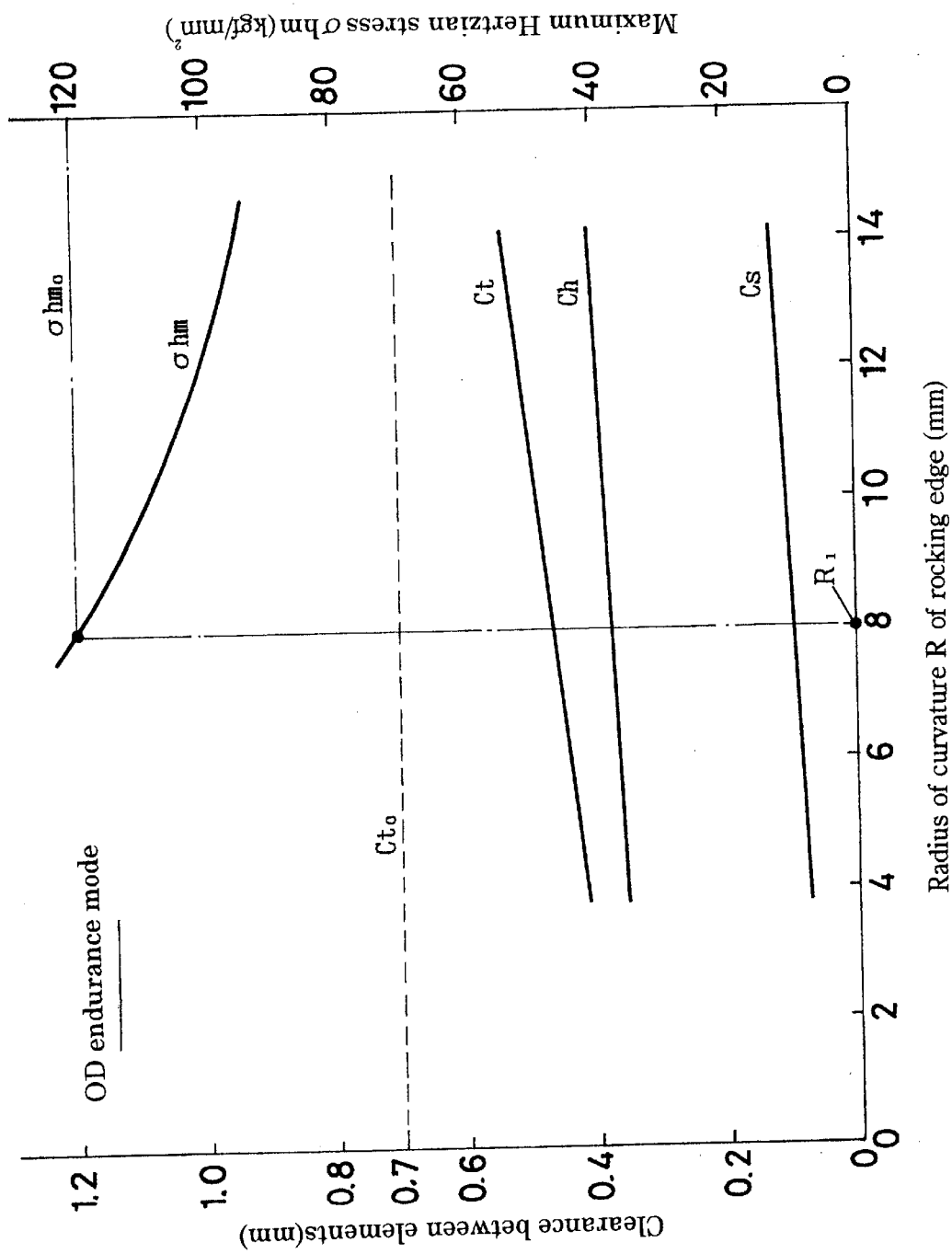
FIG. 7 is a graph showing results in a OD endurance motor of an embodiment.
Figure 8:
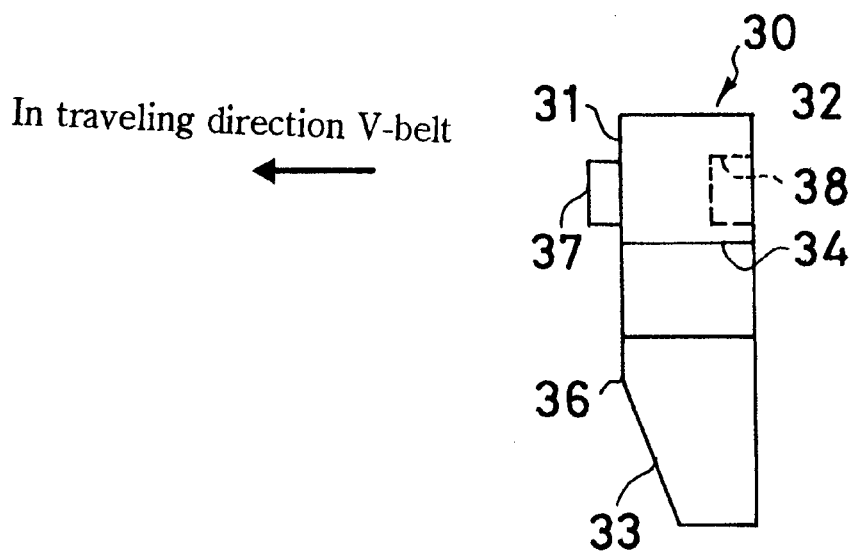
FIG. 8 is a side view showing an example of the composition of conventional elements.
Figure 9:
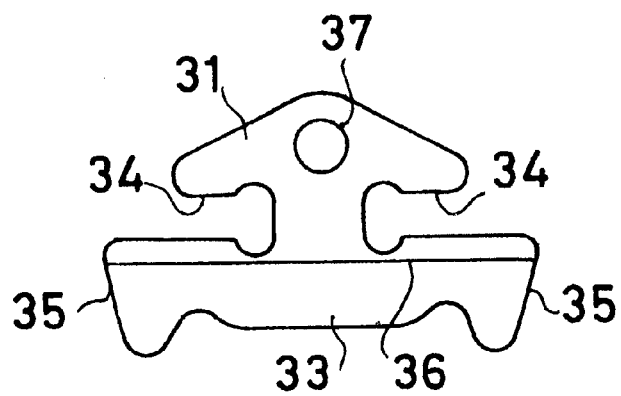
FIG. 9 is a front view showing an example of the composition of conventional elements.

③ OD (overdrive): change gear ratio=0.5, input torque= 14.5 kgf-m, input rpm=4000 rpm The tables in FIG. 5 to FIG. 7 shows these results. These tables show the clearance Cs during a no-load stop in the clearance between elements, the clearance Ch occurring due to Hertzian stress, and the total clearance Ct, respectively. The rocking edge radius of curvature R (mm) is the horizontal axis on each of these tables. The clearance between elements (mm) and the maximum Hertzian stress σhm ( kgf/mm2) is the vertical axis.

Based on FIG. 5 to FIG. 7, the allowable clearance value Cto of the total clearance is set to a male coupling height h=0.7 mm and the allowable value σhmo of the maximum Hertzian stress is set to the upper limit value σho of the Hertzian stress of the element 20=120 kgf/mm2 in this embodiment and the lower limit value R1 and the upper limit value R2 of the rocking edge radius of curvature R were found. As a result, in ① LOW endurance motor R1=6 mm (R2 was not found), in ② TOP endurance motor R1=9 mm, R2=14 mm, and in ③ OD endurance motor R1=8 mm (R2 was not found). From these results, the lower limit value R1 of the rocking edge radius of curvature R that satisfies conditions in any of the endurance motors is R1=9 mm and the upper limit value R2 is R2=14 mm. Therefore, the range of the rocking edge radius of curvature R in this embodiment is set to be 9≦R≦14 (mm).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A metal V-belt, comprising:

an endless belt shaped metal ring member and a plurality of metal element members supported along said metal ring member and that transmits power between a drive pulley and a driven pulley, said metal element members have a cross-sectional convex circular arc-shaped rocking face and incline forward and rearward about said cross-sectional convex circular arc-shaped rocking face relative to a traveling direction of said metal V-belt to contact a rear surface and a front surface of opposing front and rear metal element members, respectively, and further have a convex portion with a protruding height and a concave portion on front and rear surfaces and by means of engaging said opposing front and rear metal element members together, said convex portion and said concave portion can be lined up in a row at the front and rear surfaces on said metal element members, wherein a radius of curvature (R) of said rocking face is designed such that an allowable total clearance value between the total metal element members is less than the protruding height of said convex portion, the allowable total clearance value being a sum of a no-load stop clearance value and a compression stress clearance value, the no-load stop clearance value occurring between the metal element members during a no-load stop when said metal V-belt is stretched between said drive pulley and said driven pulley, the compression stress clearance value occurring between the metal element members due to compression stress acting on said rocking edge of said metal element members while said metal V-belt is transferring power.

2. A metal V-belt as set forth in claim 1, wherein each said metal element member having a front surface and a rear surface parallel to each other and the front surface and rear surface forming said principal plane, and a tapered surface whose thickness reduces towards said rear surface and being formed on the lower half of said front surface, and said rocking face being formed and extending laterally at a boundary between said front surface and said tapered surface, and said rocking face having a convex circular arc-shaped radius of curvature R in a cross-sectional shape along a perpendicular surface extending forward and rearward.

3. A metal V-belt as set forth in claim 1, wherein said clearance Cs during a no-load stop being calculated by the equation $Cs=Co-\Delta C$ from a reduced clearance amount $\Delta C$ when an initial clearance Co is wound between said drive pulley and said driven pulley in a natural toroidal state.

4. A metal V-belt as set forth in claim 1, wherein the radius of curvature R of said rocking face being stipulated such that a maximum compression stress acting on said rocking face while said metal V-belt is transferring power is a value less than an allowable compression stress that satisfies an opposing pitching lifespan of said metal element members.

5. A metal V-belt as set forth in claim 2, wherein on each said metal element member said convex portion comprising a cylindrical-shaped protruding male coupling and is formed on said front surface and said concave portion comprising a cylindrical-shaped female coupling and is formed in said rear surface, said male coupling engaging said female coupling of the opposing front and rear metal element members forming a composition wherein the plurality of metal element members are linked in a row.

6. A metal V-belt for transmitting power between a drive pulley and a driven pulley, the metal V-belt comprising:

an endless ring member fabricated from metal; and a plurality of metal elements successively mounted to the endless ring member, each metal element extending along and about a longitudinal axis, a lateral axis and a transverse axis which are oriented perpendicularly relative to each other, each metal element having a flat rear surface defining a rear plane extending laterally and transversely and a front surface defining a thickness therebetween along the longitudinal axis, the front surface having a flat front portion defining a front plane that is oriented parallel with the rear plane, a tapered front portion tapering towards the flat rear surface and an arcuate front portion interconnecting the flat front portion and the tapered front portion to form a laterally extending smooth rocking face between the flat front portion and the tapered front portion, each metal element including a male coupling projecting generally centrally and longitudinally from the flat front portion and a hole formed into the flat rear surface in longitudinal alignment with the male coupling with the hole sized and adapted to engaged the male coupling from an immediately preceding metal element, each metal element including a channel extending laterally and between the flat front portion and the flat rear surface to form a saddle surface on which the endless ring member is supported, the rocking face having a radius of curvature and a center of the radius of curvature being disposed adjacent the saddle surface and longitudinally between the arcuate front portion and the flat rear surface wherein, when successive ones of the metal elements turn about either the drive pulley or the driven pulley, the flat rear surface of a turning one of the metal elements rocks about the rocking face of a non-turning immediately preceding metal element.

7. A metal V-belt according to claim 6, wherein the male coupling has a height and the radius of curvature of the rocking face is less than the height of the male coupling.

* * * * *